2,934,474

FERMENTATION PROCESS FOR THE PRODUCTION OF D-ARABITOL

Owen Lavin, Wirral, and John William Holloway, East Horsley, Leatherhead, England, assignors to Commercial Solvents (Great Britain) Limited, New Ferry, England, a company of Great Britain No Drawing. Application January 29, 1958
Serial No. 711,802

Claims priority, application Great Britain
February 13, 1957

7 Claims. (Cl. 195—37)

This invention relates to the production of polyhydric alcohols, and in particular to the production of D-arabitol, by fermentation.

It is known that certain microorganisms such as the osmophilic yeasts can produce polynydric alcohols such as D-arabitol and glycerol when grown in a fermentation medium containing a high concentration of glucose. Fermentations of this type are described, for example, in published work by Spencer and Sallans Canadian Journal of Microbiology (1956) 2, pages 72–79. The microorganisms referred to in this work are mainly classified as strains of the genus Zygosaccharomyces. Since some confusion apparently exists between various authorities as to the exact nomenclature of the osmophilic yeasts, the systems of nomenclature adopted in the present application is that described in Lodder and Kreger-van-Rij's book, "The Yeasts a Taxonomic Study," published by Interscience Publishers, New York, 1952. In the nomenclature of these authors all osmophilic yeasts are classified either as *Saccharomyces rouxii* or *Saccharomyces mellis* and it is to these organisms that the present invention is applicable.

Published work has shown that when fermentation media containing glucose as the carbohydrate source is fermented by these osmophilic yeasts, several polyhydric alcohols such as D-arabitol, glycerol and erythritol, are produced and the possible yield of any one of these alcohols is thus reduced by the concomitant production of one or more of the other alcohols from the same carbon source.

It is an object of this invention to provide a method of fermentation giving increased yields of D-arabitol.

Accordingly, the present invention is a method for producing D-arabitol, comprising fermenting under submerged and aerated conditions, a suitable nutrient median with a D-arabitol-producing strain of *Saccharomyces rouxii* or *Saccharomyces mellis* wherein the nutrient medium contains high test molasses as the major source of assimilable carbon, and recovering D-arabitol from the fermented medium.

The microorganisms are grown under submerged fermentation conditions to provide a liquid fermentation broth which is readily handled in the subsequent recovery stages. Since the fermentation is an aerobic fermentation, aeration is provided, for example by passing air through the medium during fermentation. The passing of air is necessary for the desired fermentation to take place and mechanical agitation improves the yield of the desired products.

It has been found that certain strains of *Saccharomyces rouxii* and *mellis* produce only polyhydric alcohols other than D-arabitol, for example, glycerol and erythritol, and the present invention is restricted to those strains of the organisms which produce D-arabitol either with or without the concomitant production of other polyhydric alcohols.

Suitable strains of the organisms may be selected by the inoculation of a suitable sterile nutrient medium, for example, containing about 20% weight/volume glucose, 1% weight/volume yeast extract and 0.1%–0.15% weight/volume urea, with the strains of yeast under investigation and subjecting the mixture to shaking at a temperature in the range about 30° C.–37° C., for a suitable period, during which samples of the broth are withdrawn and examined by a chromatographic separation on paper to detect the presence of D-arabitol. The chromatographs may be developed, and the polyhydric alcohols detected, by the method described by Neish, Analytical Methods for Bacterial Fermentations, Second Review, National Research Council of Canada, N.R.C. 2952, 1952.

By the term a "suitable nutrient medium" is meant a fermentation medium which will support a growth of the micro-organism and the production of D-arabitol during fermentation. In addition to the major carbon source which in the present invention comprises high test molasses, it has been found that the presence of an additional simple nitrogen source, such as urea, is required, for example in a concentration of about 0.05% to 0.1% weight for volume to support growth and D-arabitol production. It is also preferred to add a further small proportion of an organic nitrogen source such as corn steep liquor or yeast extract to aid the fermentation, for example, in concentrations of about 0.3% to 1.5%. This substance may also provide a minor proportion of assimilable carbon during the fermentation.

Since the major proportion of the carbon source is present as high test molasses, it has been found advantageous to add, at the beginning of the fermentation, a small amount of invertase enzyme, for example, about 0.02 to 0.03% volume for volume. The enzyme is conveniently sterilised with the urea by Seitz filtration in the form of an aqueous solution and then added to remaining ingredients of the medium which have been separately heat sterilised.

The term high test molasses, which is well recognized in the art, includes molasses which are obtained from the extraction of whole sugar cane, and from which no sugar has been crystallised or otherwise extracted for other purposes, such as domestic sugar production. It, therefore, contains substantially the whole of the total sugar content of sugar cane and usually assays at between about 70% and 80% of total sugars, mainly in the form of sucrose, although some inversion to glucose and fructose may have taken place.

The osmophilic yeasts are capable of growth and fermentation in high concentrations of sugars and it has been found suitable in the process of the present invention to ferment media containing sugar in concentrations in the range of about 15% to 25% weight for volume, although lower or higher concentrations may be fermented if desired.

It has been unexpectedly found that high test molasses when substituted for glucose in the fermentation medium as the major source of assimilable carbon gives an increase in the amount of D-arabitol produced during the fermentation. In fermentations when glycerol is produced simultaneously by the organism, it appears, that at least in some cases, the yield of glycerol is reduced as the yield of D-arabitol is increased.

D-arabitol may be recovered from the fermented medium by any method known in the art. For example, the volume of the fermented medium may be reduced by the removal of water and the concentrat⁻ then extracted with a lower aliphatic alcohol such as butanol as described in our copending application 4862/57. Butanol has been found to be of particular value in the recovery of D-arabitol since the desired amount of water may be removed by azeotropic distillation before separating the butanol and allowing the D-arabitol to crystallise out on cooling.

In fermentations which also produce glycerol this compound may also be recovered as a valuable by-product, for example by steam distillation of the fermented medium before extracting D-arabitol.

The following example is given to illustrate the increased yield of D-arabitol in a fermentation in which the major source of assimilable carbon is high test molasses when compared with a similar fermentation having an equivalent amount of glucose as a major source of carbon.

Example

Two batches of fermentation media were prepared and heat sterilised.

Medium A contained 20% weight for volume of glucose and 1% weight/volume of yeast extract.

Medium B contained 30% weight for volume of highest molasses (equivalent to 20% weight for volume total sugars in the medium) and 0.375% volume for volume of corn steep liquor.

To medium A was added 0.15% weight/volume urea and to medium B 0.075% urea which had been sterilised by Seitz filtration. Also to medium B was added 0.025% invertase enzyme which had been sterilised with the urea solution.

The media were then seeded with an inoculum of an osmophilic strain of Saccharomyces isolated from brood comb pollen and grown in a 20% glucose medium in a shake-flask. The seeded media were then fermented for 8 days with aeration at the rate of 700 mls. of air per minute and mechanical agitation at 270 r.p.m. at a temperature range between 35° C. and 37° C. At the end of this period samples of the broth were assayed for the D-arabitol and glycerol content by the periodate method and the following results were obtained; the yields being expressed on a weight/volume basis with respect to the fermentation volume.

|  | D-arabitol, percent | Glycerol, percent |
|---|---|---|
| Medium A (20% glucose) | 6.2 | 3.5 |
| Medium B (30% High Test molasses) | 9.0 | 1.2 |

We claim:
1. A method for producing D-arabitol, comprising fermenting under submerged and aerated conditions a suitable nutrient medium with a D-arabitol-producing strain of an osmophilic yeast selected from the group consisting of *Saccharomyces rouxii* and *Saccharomyces mellis* wherein the nutrient medium contains high test molasses as the major source of assimilable carbon and recovering D-arabitol from the fermented medium.
2. A method as claimed in claim 1 wherein the medium also contains urea.
3. A method as claimed in claim 1 wherein the medium also contains corn steep liquor.
4. A method as claimed in claim 1 wherein the medium also contains an extract of yeast.
5. A method as claimed in claim 1 wherein the enzyme invertase is also present in the nutrient medium.
6. A method as claimed in claim 1 wherein sufficient molasses are present in the medium to provide a concentration of between about 15% to 25% weight for volume of total sugars.
7. A method as claimed in claim 1 wherein the fermentation is carried out at a temperature in the range about 30° C. to 37° C.

References Cited in the file of this patent
UNITED STATES PATENTS

| 2,272,982 | Owen | Feb. 10, 1942 |
| 2,680,703 | Brooks | June 8, 1954 |
| 2,793,981 | Sencer et al. | May 28, 1957 |

OTHER REFERENCES

Chemical Abstracts 50: 6588(d), Solberg, Acta. Chem. Scand. 9 (1955), 1234–5 (in English).